(12) United States Patent
Heider et al.

(10) Patent No.: US 12,244,194 B2
(45) Date of Patent: Mar. 4, 2025

(54) STATOR OF AN ELECTRICAL MACHINE

(71) Applicant: Robert Bosch GmbH, Stuttgart (DE)

(72) Inventors: Andreas Heider, Stuttgart (DE); Meiko Boley, Leonberg (DE); Nikola Goranovic, Hannover (DE); Tobias Hein, Gronau (DE)

(73) Assignee: Robert Bosch GmbH, Stuttgart (DE)

( * ) Notice: Subject to any disclaimer, the term of this patent is extended or adjusted under 35 U.S.C. 154(b) by 297 days.

(21) Appl. No.: 18/005,423

(22) PCT Filed: Jul. 6, 2021

(86) PCT No.: PCT/EP2021/068583
§ 371 (c)(1),
(2) Date: Jan. 13, 2023

(87) PCT Pub. No.: WO2022/012999
PCT Pub. Date: Jan. 20, 2022

(65) Prior Publication Data
US 2023/0283132 A1    Sep. 7, 2023

(30) Foreign Application Priority Data

Jul. 16, 2020 (DE) ..................... 10 2020 208 921.3

(51) Int. Cl.
*H02K 3/28* (2006.01)
*H02K 15/00* (2006.01)

(52) U.S. Cl.
CPC ........... *H02K 3/28* (2013.01); *H02K 15/0081* (2013.01)

(58) Field of Classification Search
CPC ............ H02K 3/28; H02K 3/50; H02K 3/505; H02K 2203/06; H02K 15/0056; H02K 15/0062; H02K 15/0068; H02K 15/0081
See application file for complete search history.

(56) References Cited

U.S. PATENT DOCUMENTS

2002/0041129 A1*  4/2002  Oohashi ................ H02K 3/50
                                                          310/179
2003/0137207 A1   7/2003  Tamura et al.
(Continued)

FOREIGN PATENT DOCUMENTS

CN    101432951 B  * 12/2011  ......... H02K 15/0081
CN    107005116 A  *  8/2017  ............ H01R 4/021
(Continued)

OTHER PUBLICATIONS

Translation of International Search Report for Application No. PCT/EP2021/068583 dated Oct. 14, 2021 (2 pages).

*Primary Examiner* — Jeremy A Luks
(74) *Attorney, Agent, or Firm* — Michael Best & Friedrich LLP (57) ABSTRACT

The present invention relates to a stator of an electric machine with a stator body having a stator axis, which stator body comprises stator grooves in which there runs an electric plug-in winding which is formed from multiple conductor elements (4), conductor elements (4) being provided which each run with conductor branches through one or two of the stator grooves and protrude from the stator grooves on at least one end face of the stator by means of conductor ends (4b) and form a winding head, the conductor ends (4b) of the conductor elements (4) being arranged in the corresponding winding head in a plurality of groups (7) distributed in the circumferential direction in relation to the stator axis, each group (7) comprising a plurality of conductor ends (4b) arranged in a radial direction in relation to the stator axis, in particular aligned in the radial direction, characterized in that at least one, in particular a plurality, of the conductor ends (4b) of each group (7), as viewed in the radial direction, has raised structures (8) arranged on both sides, in such a way that the raised structures (8) on a first side (14) of the conductor end (4b), when the entire group (Continued)

(7) of conductor ends (4b) is clamped between two clamping jaws, permit the conductor end (4b) adjacent to the first side (14) and the conductor end (4b) having structures (8) to be approached towards one another elastically or plastically by the clamping jaws in order for the relevant conductor ends (4b) to be welded, and, on an opposite, second side (15) maintain a distance between the conductor end (4b) adjacent to the second side (15) and the conductor end (4b) having structures (8) in order to prevent a welding of the relevant conductor ends (4b).

15 Claims, 6 Drawing Sheets

(56) References Cited

U.S. PATENT DOCUMENTS

| | | | |
|---|---|---|---|
| 2009/0100665 | A1 | 4/2009 | Berger et al. |
| 2010/0102664 | A1* | 4/2010 | Chen ................. H02K 3/12 310/179 |
| 2019/0036428 | A1 | 1/2019 | Murata et al. |
| 2019/0280542 | A1* | 9/2019 | Kawanami ......... H01R 43/0228 |
| 2019/0326801 | A1* | 10/2019 | Hein ....................... B23K 26/22 |
| 2020/0067388 | A1* | 2/2020 | Zeadan .................. H02K 3/12 |
| 2021/0288538 | A1* | 9/2021 | Hein ....................... B23K 26/24 |

FOREIGN PATENT DOCUMENTS

| | | | | |
|---|---|---|---|---|
| DE | 102012215309 A1 | * | 3/2013 | ........... B23K 11/002 |
| JP | 4066834 B2 | | 3/2008 | |
| JP | 2016189657 A | * | 11/2016 | |
| WO | WO-2018028856 A1 | * | 2/2018 | |

\* cited by examiner

STATOR OF AN ELECTRICAL MACHINE

BACKGROUND

The present invention relates to a stator of an electrical machine. The stator of the electrical machine has an optimized connection of conductor ends of a plug-in winding. In addition, the invention relates to an electrical machine having such a stator and to a method for producing such a stator.

Electrical machines whose stators have plug-in windings are known from the prior art. In this case, conductor elements in a U-shape or an I-shape are inserted through a stator body, wherein ends of these conductor elements are welded together. If the ends of the conductor elements are not completely stripped electrically, there is the risk that insulation residues will be heated during the welding process and vaporize, as a result of which process irregularities can occur. In order to avoid this, conductor ends to be welded are not brought together completely, for example before welding, or are clamped with reduced clamping force in order to allow insulation residues to outgas.

SUMMARY

The stator according to the invention of an electrical machine enables, on the one hand, reliable outgassing of possibly existing insulation residues or dirt or other contaminations, such as lubricant, while at the same time making possible a full clamping of the conductor ends to be welded. In this way, a defined clamping situation can thus be achieved during clamping, whereby the subsequent welding process can be carried out reliably and free of defects. Overall, the quality of the electrical and mechanical connection of adjacent conductor ends is thus increased.

The stator of an electrical machine has a stator axis. In addition, the stator has a stator body which extends around said stator axis. The stator body in turn has stator grooves in which an electrical plug-in winding runs. The electrical plug-in winding is formed from a plurality of conductor elements, wherein conductor elements are provided which in each case run with conductor branches through one or two of the stator grooves. On at least one end face of the stator, the conductor elements protrude with conductor ends from the stator grooves and form a winding head. These conductor elements are, for example, U-shaped or I-shaped.

The conductor ends of the conductor elements are arranged in the respective winding head in a plurality of groups distributed in the circumferential direction in relation to the stator axis. Each group has a plurality of conductor ends arranged along a radial direction in relation to the stator axis. The conductor ends are particularly advantageously arranged aligned in the radial direction.

If conductor ends are to be welded to produce a winding from the individual conductor elements, then in particular radially adjacent conductor ends will be welded. In order to carry out a clamping of the conductor ends simply and with little effort, it is provided in particular that at least one conductor element, in particular a plurality of conductor ends, of each group, as viewed in the radial direction, has raised structures arranged on both sides. These structures are arranged in such a way that when the entire group of conductor ends is being clamped between two clamping jaws, at least one raised structure on a first side of the conductor element permits an approach, elastically or plastically effected by the clamping jaws, between the conductor end adjacent to the first side and the conductor end having the raised structures arranged on both sides, in order for the relevant conductor ends to be welded. At least one raised structure is arranged on a second side opposite the first side and maintains a distance between the conductor end adjacent to the second side and the conductor end having the raised structures arranged on both sides, in order to prevent welding of the relevant conductor ends.

In this way, by the use of the described structures the stator enables secure and reliable welding of corresponding conductor ends. Prior to the welding, the entire group of radially arranged conductor ends is clamped so that this clamping process can be carried out simply and with little effort. Once the conductor ends are clamped, a defined clamping situation can be achieved; in particular, the clamping force is not affected by external influences such as due to the process safety due to insulation residues outgassing. This enables optimal clamping of the conductor ends.

The corresponding raised structures which are arranged on both sides on at least one conductor end also define which conductor ends are to approach one another and which conductor ends are to remain spaced apart. The corresponding raised structures enable the conductor ends to be welded to approach one another, whereby a conductor end arranged correspondingly adjacently to the conductor end with the raised structures on both sides is elastically or plastically deformed. Additionally, the structures enable a distance to be maintained from a conductor end arranged opposite, so that welding is not possible here. It can thus be achieved that in particular only two adjacent conductor ends are welded. In this way, the plug-in winding can be formed simply and with little effort.

Due to the raised structures, the conductor ends are advantageously brought together only in a region to be welded. Other regions are still spaced apart by the structures so that degassing channels are formed along which degassing of vaporizing insulation residues is enabled. In this way, a joining quality of two conductor ends to be connected is increased.

The dependent claims contain preferred developments of the invention.

It is preferably provided that each raised structure is arranged opposite a raised structure of another conductor end or a side face of another conductor end. If two raised structures of two different conductor ends are arranged opposite one another, a distance between these two conductor ends can be maximized. It is provided here that the conductor ends that are not to be connected to one another also have no electrical contact with one another due to the raised structures. After connection of the electrical conductor ends to be connected, a separation of such conductor ends that are not to have any electrical contact thus advantageously takes place. This can be achieved, for example, by a corresponding bending of the conductor ends; likewise, an electrical insulation can also be introduced between the conductor ends.

Each conductor end preferably has a first region directly adjoining an end face of the conductor element and extending in the longitudinal direction of the conductor element. In addition, each conductor end has a second region directly adjoining the first region and extending in the longitudinal direction of the conductor element. It is particularly advantageously provided that both the first region and the second region have no electrical insulation, wherein the electrical insulation of the conductor element particularly advantageously adjoins the second region. In other words, the first region and the second region are preferably stripped electrically. It is furthermore preferably provided that at least one conductor end having structures on both sides has on the first side at least one raised structure on the second region, while the first regions both of the conductor end having the structures raised on both sides and of the conductor end adjacent to the first side are free of raised structures. In other words, a possibility is thus achieved for the conductor end having the structures and the conductor end adjacent on the first side to abut one another only in the second region due to at least one structure. The conductor end adjacent on the first side can optionally have a structure in the second region but can also be formed without a structure in the second region. In any case, a formation of structures in the first region is prevented. This makes it possible that when a clamping force is applied, an elastic or plastic deformation of the conductor end adjacent on the first side takes place in order to enable the corresponding conductor ends to be brought together and thus welded. In an alternative or additional embodiment, it is provided that a conductor end having the raised structures arranged on both sides has on the second side at least one raised structure on the first region and at least one raised structure on the second region. In this case, contact with the conductor end adjacent on the second side is thus achieved both in the first region and in the second region. The conductor end adjacent on the second side can optionally have no raised structures or also have raised structures both in the first region and in the second region. In any case, the raised structures prevent elastic or plastic deformation of the corresponding conductor ends so that these conductor ends also cannot be brought together. Welding of the conductor ends is thus also prevented. The raised structures reliably enable distinguishing of conductor ends to be electrically connected and conductor ends to be electrically separated, wherein at the same time a clamping of the entire group of conductor elements, for example by clamping jaws, is enabled. Handling of the conductor ends during welding is thus possible in a simple manner with little effort. At the same time, the structures enable formation of degassing channels through which vaporizing insulation residues can outgas.

Preferably, two connected electrical conductor ends are designed in such a way that they have a material-fluid connection region. The material-fluid connection region is in particular a weld seam. At least one of the two electrically connected conductor ends advantageously has a recess which directly adjoins the connection region. This additional recess creates a further possibility for degassing. Once the two conductor ends are welded, vaporizing insulation material will be able to outgas through the recess. The recess advantageously extends along the entire conductor element in the radial direction in relation to the stator axis. In this way, a continuous channel is created which reliably enables outgassing.

The raised structures are preferably formed by punctiform and/or linear and/or V-shaped and/or X-shaped and/or planar elevations. The structures are particularly advantageously arranged uniformly and extend particularly advantageously parallel to the radial direction in relation to the stator axis of the stator. The raised structures can thus reliably set a distance from adjacent conductor ends, whereby the previously described effects can be achieved in a particularly advantageous manner.

The structures are particularly preferably produced by embossing or by an application method. For example, the structures can be produced by means of laser beams, whereby a melt is produced which leaves raised structures after solidification. A laser deposition welding of the raised structures is also advantageously enabled. The raised structures can thus be produced, for example, by selective laser melting or laser removal. As described above, an embossing tool may also be used, so that the structures are embossed.

The invention also relates to an electrical machine. The electrical machine has a stator, wherein the stator is designed as described above. In addition, the electrical machine has a rotor which can be driven by the stator. By using the stator as described above, said stator has optimized welded connections between correspondingly adjacent conductor elements of the plug-in winding. This optimized welded connection thus enables an optimized electrical and an optimized mechanical connection of the conductor ends. In particular, heat dissipation during operation of the electrical machine is thus also improved. The electrical machine is thus more robust in design and has a longer service life than in the prior art.

Finally, the invention relates to a method for producing a stator, in particular a stator as described above, of an electrical machine. The method comprises the following steps: Initially, conductor branches of conductor elements of a plug-in winding are arranged in stator grooves of a stator body so that conductor ends protrude on at least one end face of the stator body. A winding head is formed on this end face of the stator body. For this purpose, a plurality of groups distributed in the circumferential direction in relation to a stator axis of the stator body is formed, each group having a plurality of conductor ends arranged along a radial direction in relation to the stator axis. The conductor ends are particularly advantageously arranged aligned in the radial direction.

A clamping force is then applied. This is done by clamping the entire group of conductor ends between two clamping jaws. At least one, in particular a plurality, of the conductor ends of each group has raised structures arranged on both sides as viewed in the radial direction. As a result of the raised structures on a first side of the conductor end, due to the clamping force, an approach, effected elastically or plastically by the clamping jaws, takes place between the conductor end adjacent to the first side and the conductor end having the structures. In addition, at least one raised structure on a second side opposite the first side maintains a distance between the conductor end adjacent to the second side and the conductor end having the structures. In this way, the entire group can be clamped, but due to the structures present of the at least one conductor end, there is a differentiation between conductor ends to be connected and conductor ends to be separated. The conductor ends to be connected are brought closer to one another by one of the conductor ends deforming elastically or plastically. The conductor ends to be separated remain spaced apart from one another.

In a further step, the at least one conductor end having the structures is finally electrically connected to the conductor end adjacent on the first side and elastically or plastically deformed. An electrical connection between two conductor ends can thus be produced simply and with little effort. In addition, the structures form a degassing channel through which vaporizing insulation residues can outgas during the electrical connection process.

It is preferably provided that after the electrical connection process, a radial distance is introduced between the conductor end having the structures and the conductor end adjacent on the second side. This takes place in particular by bending. It is thereby achieved that there can be no mutual contact of these conductor ends, in particular also not via the raised structures. Since the corresponding conductor ends are not to be electrically connected, a contact and thus an electrical connection is thus prevented by the distance. Additionally, it is preferably provided that an insulation element is introduced between these conductor ends.

Finally, it is preferably provided that conductor ends to be electrically connected are connected in a material-fluid manner. In particular, the material-fluid bonding takes place by welding. This is particularly preferably laser welding. A reliable connection of the conductor ends is thus achieved, wherein these are optimized both with regard to electrical quality and with regard to mechanical quality. As described above, any insulation residues present can outgas through the previously described degassing channels.

BRIEF DESCRIPTION OF THE DRAWINGS

Exemplary embodiments of the invention are described in detail below with reference to the accompanying drawing. In the drawing.

DETAILED DESCRIPTION

Figure 1:
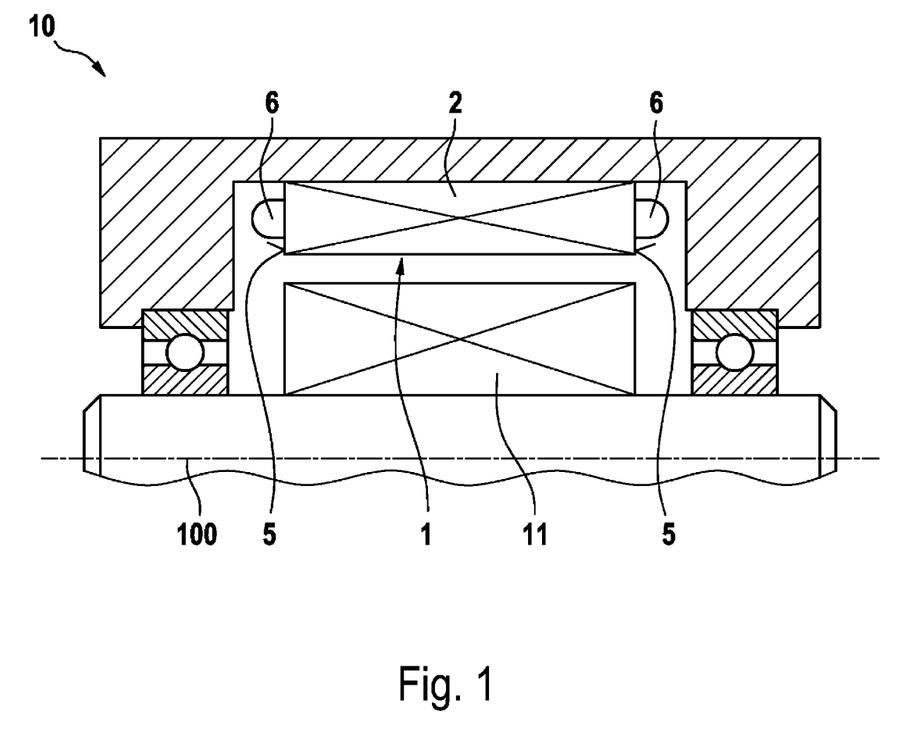
FIG. 1 shows a schematic view of an electrical machine according to an exemplary embodiment of the invention.

FIG. 1 schematically shows an electrical machine 10 according to an exemplary embodiment of the invention. The electrical machine 10 has a stator 1 which drives a rotor 11. The stator 1 extends around a stator axis 100. The stator axis 100 is at the same time a central axis of the electrical machine 10.

The stator 1 has a stator body 2 which extends in the shape of a hollow cylinder around the stator axis 100 and on the inside of which the rotor 11 is arranged. The stator body 2 also serves for receiving a plug-in winding, which forms a winding head 6 on each end face 5 of the stator body 2.

Figure 2:
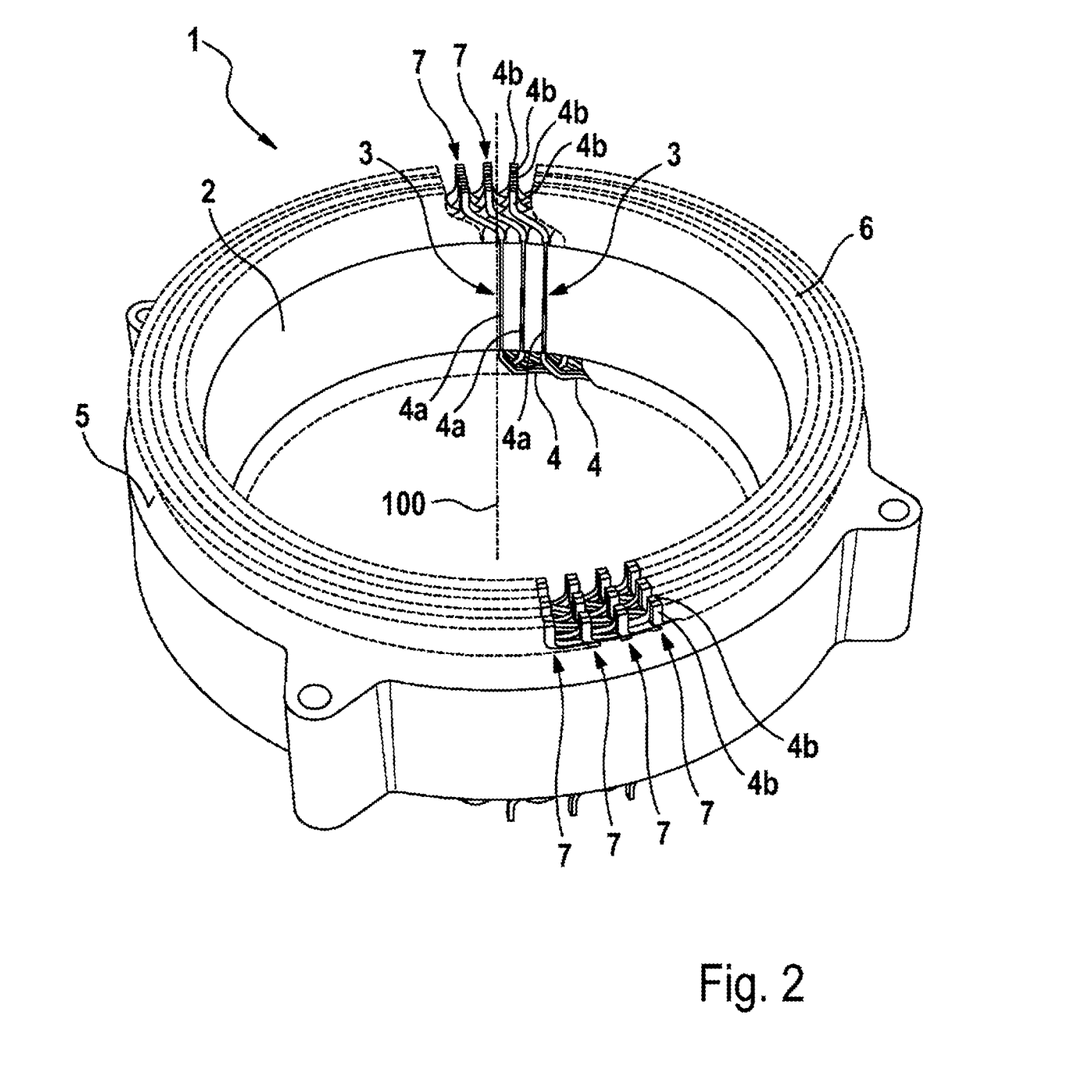
FIG. 2 shows a schematic view of a stator of the electrical machine according to the exemplary embodiment of the invention.

FIG. 2 schematically shows the stator 1 of the electrical machine according to the exemplary embodiment of the invention. For receiving the plug-in winding, the stator 1 has stator grooves 3 in the stator body 2, wherein conductor branches 4a of conductor elements 4 run through one or two of the stator grooves 3.

In order to produce the plug-in winding of the stator 1, U-shaped or I-shaped conductor elements 4 are used, the conductor branches of which are thus guided through one or two of the stator grooves 3. On at least one end face 5, these conductor elements 4 thus form a winding head 6 on which conductor ends 4b of the conductor elements 4 are connected. In particular, two conductor ends 4b are always connected to one another in order to produce the plug-in winding.

As shown in FIG. 2, groups 7 are arranged distributed around the circumference of the stator 1 and spaced apart in the circumferential direction in relation to the stator axis 100, wherein each group has a plurality of conductor ends 4b. The conductor ends 4b of each group are arranged in the radial direction, in particular radially aligned, in relation to the stator axis 100. Two conductor ends 4b from this group are to be electrically connected in each case, while the remaining conductor ends or the connected conductor ends 4b are to be separated from other conductor ends 4b or from other connected conductor ends 4b.

Figure 3:
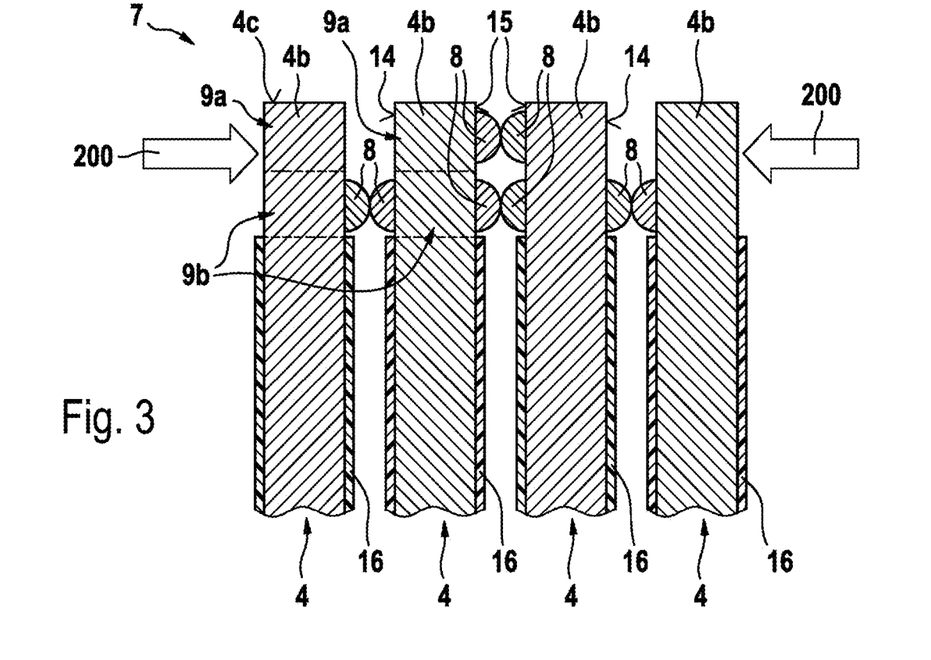
FIG. 3 shows a first schematic view of a group of conductor ends of the stator of the electrical machine according to the exemplary embodiment of the invention.
Figure 4:
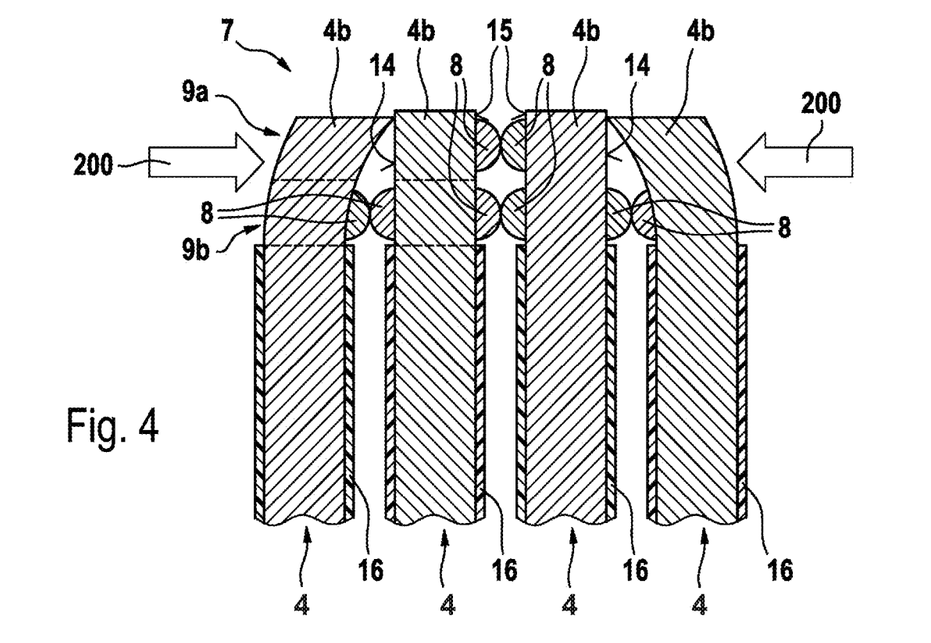
FIG. 4 shows a second schematic view of the group of conductor ends of the stator of the electrical machine according to the exemplary embodiment of the invention.
Figure 5:
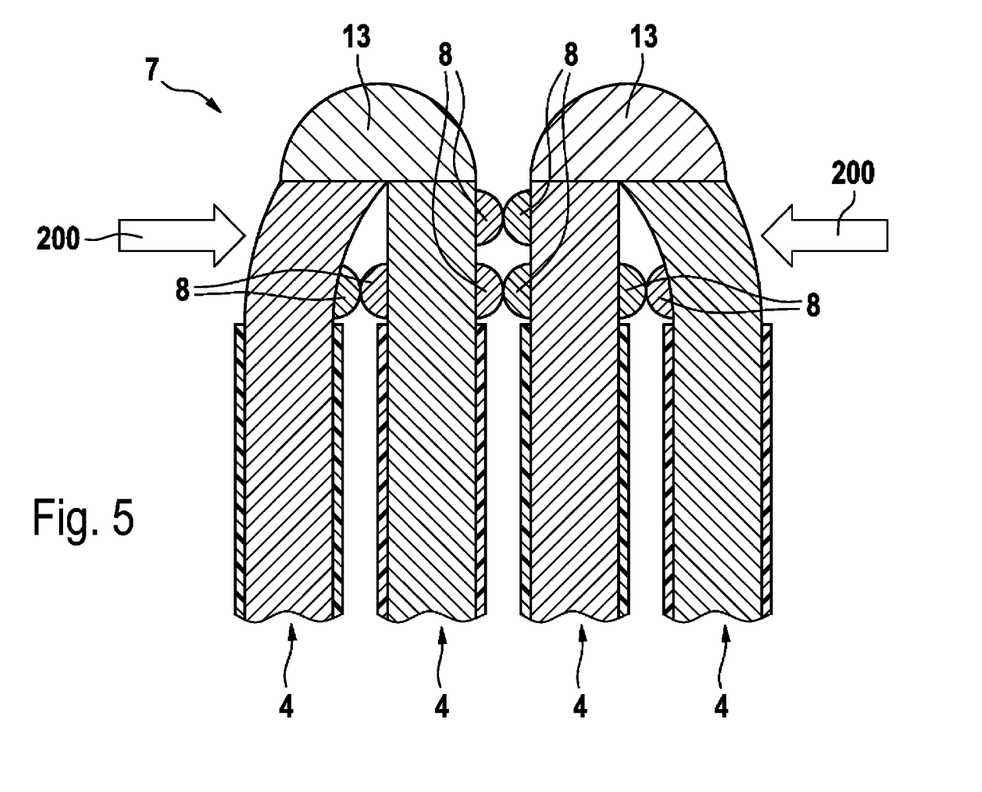
FIG. 5 shows a third schematic view of the group of conductor ends of the stator of the electrical machine according to the exemplary embodiment of the invention.

A simple and low-effort possibility of connecting the conductor ends is shown in FIG. 3, FIG. 4 and FIG. 5, which illustrate a production method according to an exemplary embodiment of the invention and thus show an arrangement of the stator 1 of the electrical machine 10 according to the exemplary embodiment of the invention. For better illustration, a group 7 of conductor ends 4b is shown in FIGS. 3 to 5, wherein the group 7 has four conductor ends 4b.

In the illustration according to FIG. 3, the outermost conductor ends 5 are in each case to be electrically connected to the adjacent middle conductor element 4. For this purpose, the two inner conductor ends 4b are formed with structures 8 raised on both sides. The raised structures 8 are thus applied to both sides of the conductor end 4b in relation to the radial direction of the stator 1. Application can take place in particular by laser melting or laser removal. Likewise, laser deposition welding can be used to produce the structures 8. Finally, it is also possible to use an embossing tool for embossing the structures 8.

The conductor ends 4 have a first region 9a and a second region 9b. The first region 9a directly adjoins an end face 4c of the corresponding conductor element 4 and extends in the longitudinal direction of the conductor element 4. The second region 9b, which likewise extends along the longitudinal direction of the conductor element 4, directly adjoins the first region 9a.

The two conductor ends 4b with raised structures 8 on both sides have on in each case a first side 14 at least one raised structure 8 only on the second region 9b, while no raised structure is applied to the first region 9a on the first side 14. The same applies to the conductor end 4b which is adjacent to the respective first side 14 and, in FIG. 3, has at least one raised structure 8 only on the second region 9b. In an alternative embodiment, raised structures 8 on the corresponding conductor end 4b may also be dispensed with entirely.

When the entire group 7 is clamped between clamping jaws (not shown), a clamping force 200 is applied. This clamping force 200 causes the outer conductor ends 4b to be elastically or plastically deformed, since no support is present at the corresponding first regions 9a. This elastic or plastic deformation is shown in FIG. 4. Due to the deformation, a distance between the respective conductor ends 4b having the raised structures 8 on both sides and the corresponding conductor ends 4b adjacent on the first sides 14 is reduced. This reduced distance subsequently enables an electrical connection of these corresponding conductor ends 4b, which is shown in FIG. 5. FIG. 5 shows that the conductor ends are electrically connected by a connection region 13. The connection region 13 is preferably a material-fluid connection region and may particularly advantageously be a weld seam.

The conductor elements 4 that are not to be electrically connected are spaced apart by the raised structures 8. This is the case with the two inner conductor ends 4b. For this purpose, these conductor ends 4b have at least one structure 8 both in the first region 9a and in the second region 9b on the second sides 15 that are in each case opposite the first sides 14. In this way, a support is provided both in the first region 9a and in the second region 9b, as a result of which no relative deformation can occur between these conductor ends 4b, that is to say the conductor ends 4b in each case adjacent on the second sides 15. This is shown accordingly in FIGS. 4 and 5. An electrical connection of the corresponding conductor ends 4b adjacent on the second sides 15 is thus prevented.

FIG. 5 shows that the structures 8 on the second sides 15 of the conductor ends 4b having the raised structures 8 on both sides abut one another. This creates an electrical contact which is to be avoided. Thus, in a further step, these conductor ends 4b are separated, for example by bending and/or by introducing an electrical insulation between the corresponding conductor ends 4b.

The first region 9a and the second region 9b are preferably electrically stripped so that an electrical insulation 16 is subsequently formed on the second region 9b. If the stripping of the first region 9a and of the second region 9b has not been carried out completely, there is the possibility that, during the application of the material-fluid connection region 13, in particular during the welding, residues of the insulation will outgas. In order to allow this in a directed manner and to prevent any influence on the connection region 13, degassing channels are also formed by the structures 8. Thus, in particular by applying the structures 8 on the first side 14 in the second region 9b, it is achieved that at this point a distance between the conductor ends 4b to be electrically connected is maintained. This distance enables an outgassing of vaporizing insulation residues of the electrical insulation 16. In this way, an influence of this process on the electrical connection, that is to say on the material-fluid connection region 13, is minimized, as a result of which the connection region 13 will be of a high quality.

Figure 6A:
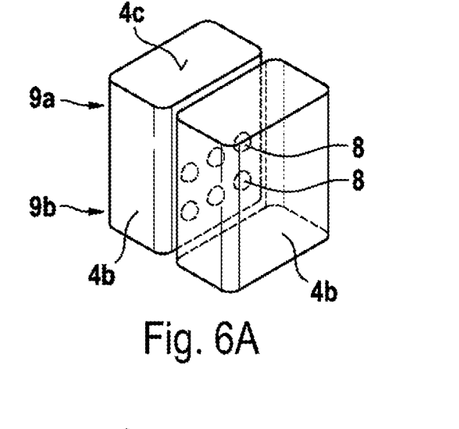
FIGS. 6A to 6F show a schematic view of various embodiments of the structures of the conductor ends of the stator of the electrical machine according to the exemplary embodiment of the invention.
Figure 6B:
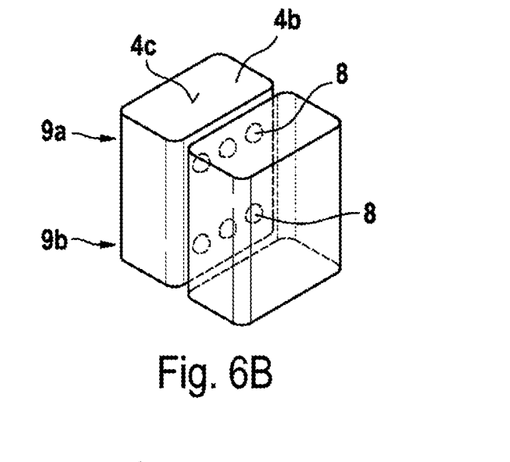

FIGS. 6a-6f show different embodiments of the structures 8. FIGS. 6a and 6b show, by way of example, that the structures 8 are designed to be punctiform and are oriented along a line which runs radially in relation to the stator axis 100. FIG. 6a shows that structures 8 are present only on the second region 9b. In FIG. 6b, in contrast, corresponding structures 8 are provided both in the first region 9a and in the second region 9b. Depending on the requirement, the structures 8 can be designed in one row (cf. FIG. 6b) or in two rows (cf. FIG. 6a) per region 9a, 9b.

Figure 6C:
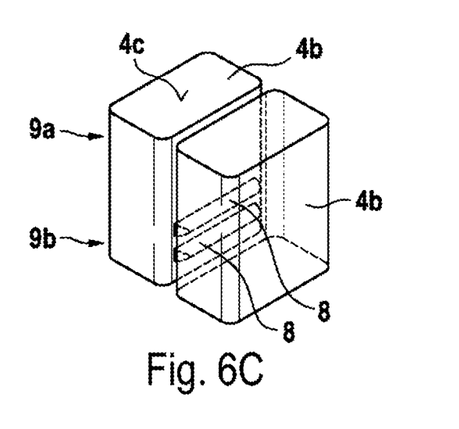
Figure 6D:
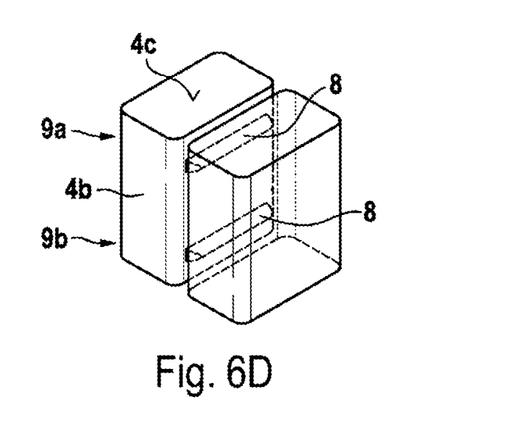

FIGS. 6c and 6d show linear designs of the structures 8, the arrangement otherwise being identical to that in FIGS. 6a and 6b. This means that the linear structures 8 are also oriented radially in relation to the stator axis 100.

Figure 6E:
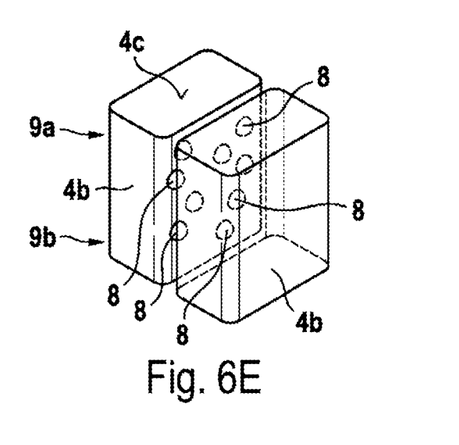
Figure 6F:
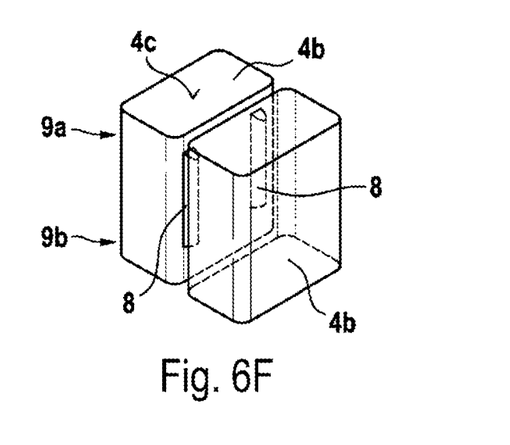

In FIG. 6e, an arbitrary distribution of the punctiform structures 8 over the entire first region 9a and second region 9b is provided. FIG. 6f in turn shows linear structures 8 which, in contrast to FIGS. 6c and 6d, are formed parallel to the stator axis 100. In FIGS. 6e and 6f, analogously to FIGS. 6b and 6d, no elastic or plastic deformation of the adjacent conductor ends 4b is thus provided so that no electrical connection is to arise between the adjacent conductor ends 4b at these points. In contrast, FIGS. 6a and 6c show the possibility of elastic or plastic deformation in the first region 9a so that these adjacent conductor ends 4b are to be electrically connected.

Figure 7A:
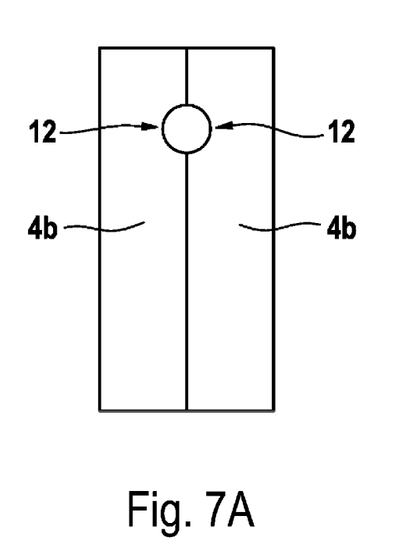
FIGS. 7A and 7B show a schematic detail view of two conductor ends of the stator of the electrical machine.
Figure 7B:
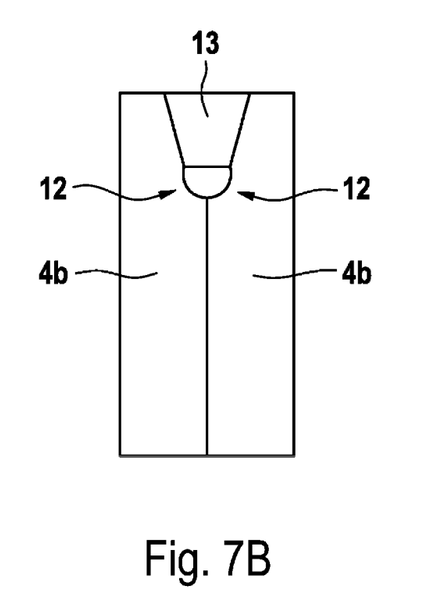

Finally, FIGS. 7a and 7b show a further possibility, an all detailed point is provided, that at least one of the two electrically connected conductor ends 4b has a recess 12 which directly adjoins the connection region 13. In FIG. 7b, this connection region 13 is formed as a weld seam. FIG. 7a shows the arrangement prior to the introduction of the connection region 13 by welding. The recess 12 is formed in both conductor ends 4b.

The recess 4b extends parallel to the radial direction in relation to the stator axis 100 through the entire conductor ends 4b so that gases produced by welding during the introduction of the connection region 13 can be transported away from the conductor ends 4b through this recess 12. The weld seam itself is thus not influenced by the outgassing of any existing residues of the electrical insulation. As a result, the weld seam has a high-quality design.

The invention claimed is:

1. A stator (1) of an electrical machine (10) comprising a stator body (2) having a stator axis (100) and comprising stator grooves (3) in which an electrical plug-in winding runs, which is formed from a plurality of conductor elements (4), wherein conductor elements (4) are provided which each run with conductor branches (4a) through one or two of the stator grooves (3) and protrude with conductor ends (4b) from the stator grooves (3) on at least one end face (5) of the stator (1) and form a winding head (6), wherein the conductor ends (4b) of the conductor elements (4) are arranged in the respective winding head (6) in a plurality of groups (7) distributed in the circumferential direction in relation to the stator axis (100), wherein each group (7) comprises a plurality of conductor ends (4b) arranged along a radial direction in relation to the stator axis (100), wherein at least one of the conductor ends (4b) of each group (7), as viewed in the radial direction, has raised structures (8) arranged on both sides, in such a way that when the entire group (7) of conductor ends (4b) is clamped between two clamping jaws, the raised structures (8) on a first side (14) of the conductor end (4b) permit an approach, effected elastically or plastically by the clamping jaws, between the conductor end (4b) adjacent to the first side (14) and the conductor end (4b) having structures (8), in order for the relevant conductor ends (4b) to be welded, and on an opposite second side (15) maintain a distance between the conductor end (4b) adjacent to the second side (15) and the conductor end (4b) having structures (8), in order to prevent welding of the relevant conductor ends (4b).

2. The stator (1) according to claim 1, wherein each raised structure (8) is arranged opposite a raised structure (8) of another conductor end (4b) or a side face of another conductor end (4b).

3. The stator (1) according to claim 1,
wherein each conductor end (4b) has a first region (9a) directly adjoining an end face (4c) of the conductor element (4) and extending in a longitudinal direction of the conductor element (4) and a second region (9b) directly adjoining the first region (9a) and extending in the longitudinal direction of the conductor element (4),
wherein at least one conductor end (4b) having structures (8) has, on the first side (14), at least one raised structure (8) on the second region (9b), while the first regions (9a) both of the conductor end (4b) having the structures (8) and of the conductor end (4b) adjacent on the first side (14) are free of raised structures (8), and/or
wherein at least one conductor end (4b) having structures (8) has, on the second side (15), at least one raised structure (8) on the first region (9a) and at least one raised structure (8) on the second region (9b).

4. The stator (1) according to claim 1, wherein two connected conductor ends (4b) have an integrally bonded connection region (13), wherein at least one of the two electrically connected conductor ends (4*b*) has a recess (12) which directly adjoins the connection region (13).

5. The stator (1) according to claim 4, wherein the integrally bonded connection region (13) is a weld seam.

6. The stator (1) according to claim 1, wherein the raised structures (8) are formed by punctiform and/or linear and/or V-shaped and/or X-shaped and/or planar elevations.

7. The stator (1) according to claim 1, wherein the structures (8) are produced by embossing or by an application method or by melting or by removal.

8. The stator (1) according to claim 1, wherein the plurality of conductor ends (4*b*) are aligned in the radial direction.

9. An electrical machine (10) having a stator (1) according to claim 1 and a rotor (11) which can be driven by the stator (1).

10. A method for producing a stator (1) of an electrical machine (10), having the steps of:
    arranging conductor branches (4*a*) of conductor elements (4) of a plug-in winding in stator grooves (3) of a stator body (2) so that conductor ends (4*b*) protrude on at least one end face of the stator body (2), and
    forming a plurality of groups (7) distributed in a circumferential direction in relation to a stator axis (100) of the stator body (2), each group (7) comprising a plurality of conductor ends (4*b*) arranged along a radial direction in relation to the stator axis (100),
    further comprising the steps of:
    applying a clamping force (200) by clamping the entire group (7) of conductor ends (4*b*) between two clamping jaws,
    wherein at least one of the conductor ends (4*b*) of each group (7), as viewed in the radial direction, has raised structures (8) arranged on both sides,
    wherein, by means of at least one raised structure (8) on a first side (14) of the conductor end (4*b*), an approach, effected elastically or plastically by the clamping jaws, takes place between the conductor end (4*b*) adjacent to the first side (14) and the conductor end (4*b*) having structures (8),
    wherein, by means of at least one raised structure (8) on an opposite second side (15), a distance between the conductor end (4*b*) adjacent to the second side (15) and the conductor end (4*b*) having structures (8) is maintained, and
    electrically connecting the conductor end (4*b*) having at least one structure (8) to the conductor end (4*b*) adjacent on the first side (14) and elastically or plastically deformed.

11. The method according to claim 10, further comprising the step of introducing a radial distance between the conductor end (4*b*) having structures (8) and the conductor end (4*b*) adjacent on the second side (15).

12. The method according to claim 10, wherein conductor ends (4*b*) to be connected electrically are integrally bonded.

13. The method according to claim 12, wherein conductor ends (4*b*) to be connected electrically are welded.

14. The method according to claim 13, wherein conductor ends (4*b*) to be connected electrically are laser welded.

15. The method according to claim 10, wherein the plurality of conductor ends (4*b*) are aligned in the radial direction.

\* \* \* \* \*